United States Patent
Yan et al.

(10) Patent No.: US 11,354,925 B2
(45) Date of Patent: Jun. 7, 2022

(54) METHOD, APPARATUS AND DEVICE FOR IDENTIFYING BODY REPRESENTATION INFORMATION IN IMAGE, AND COMPUTER READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Guixin Yan, Beijing (CN); Hao Zhang, Beijing (CN); Lili Chen, Beijing (CN); Minglei Chu, Beijing (CN); Jian Sun, Beijing (CN); Jinghua Miao, Beijing (CN); Wenhong Tian, Beijing (CN); Ruijun Dong, Beijing (CN); Bin Zhao, Beijing (CN); Ziqiang Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 437 days.

(21) Appl. No.: 16/473,509

(22) PCT Filed: Dec. 4, 2018

(86) PCT No.: PCT/CN2018/119083
§ 371 (c)(1),
(2) Date: Jun. 25, 2019

(87) PCT Pub. No.: WO2019/192205
PCT Pub. Date: Oct. 10, 2019

(65) Prior Publication Data
US 2021/0365675 A1    Nov. 25, 2021

(30) Foreign Application Priority Data

Apr. 2, 2018    (CN) .......................... 201810283309.4

(51) Int. Cl.
*G06V 40/10*   (2022.01)
*G06V 10/44*   (2022.01)
*G06V 10/56*   (2022.01)

(52) U.S. Cl.
CPC ............ *G06V 40/113* (2022.01); *G06V 10/44* (2022.01); *G06V 10/56* (2022.01); *G06V 40/103* (2022.01)

(58) Field of Classification Search
CPC .......... G06K 9/00389; G06K 9/00369; G06K 9/4604; G06K 9/4652; G06K 9/00288;
(Continued)

(56) References Cited

U.S. PATENT DOCUMENTS 9,710,708 B1 *   7/2017   Checka ............... G06K 9/00771
2009/0110286 A1 *  4/2009  Nunn .................... G06K 9/3233
                                                              382/190
(Continued)

FOREIGN PATENT DOCUMENTS

CN    102122350 A    7/2011
CN    103208002 A    7/2013
(Continued)

OTHER PUBLICATIONS

International Search Report and Written Opinion dated Mar. 4, 2019.
(Continued)

*Primary Examiner* — Nimesh Patel
(74) *Attorney, Agent, or Firm* — Dilworth & Barrese, LLP.; Michael J. Musella, Esq.

(57) ABSTRACT

A method for identifying body representation information in an image, includes: determining a skeleton-like line of a
(Continued)

body in the image; and then performing identification of the body representation information according to the skeleton-like line. An apparatus, and a device for identifying body representation information in an image and a storage medium are also provided.

18 Claims, 4 Drawing Sheets

(58) Field of Classification Search
CPC ........... G06K 9/00228; G06K 9/00255; G06K 9/3233; G06K 9/00281; G06K 9/00597; G06K 9/00248; G06K 9/00335; G06K 9/6267; G06K 9/00355; G06K 9/00208; G06K 9/00268; G06K 9/00771; G06K 9/3241; G06K 9/00302; G06F 21/32; G06F 2203/04808; G06F 3/017; G06T 5/002; G06T 7/0012; G06T 2207/10088; G06T 5/003; G06T 2207/30004; G06T 7/11; G06T 2207/30201; G06T 2207/20081; G06T 11/00; G06T 17/00; G06T 2207/30196; G06T 2219/2021; G06T 7/337; G06T 2207/10012; G06T 2207/30061; G06T 2207/20084; A61F 2/14; A61F 2007/009; G16H 50/30; G16H 40/63; G16H 50/20; G16H 30/40; G16H 10/20; G16H 20/70; G16H 50/70; A61B 5/7275; A61B 5/05; A61B 5/743; A61B 5/002; A61B 5/01; A61B 5/746; A61B 5/0077; A61B 5/0022; A61B 5/1176; A61B 5/165; A61B 5/7264; G06V 40/113; G06V 10/44; G06V 10/56; G06V 40/103; G06V 10/443
See application file for complete search history.

(56) References Cited

U.S. PATENT DOCUMENTS

| 2010/0235034 | A1* | 9/2010 | Higgins | G06K 9/00355 701/28 |
| 2012/0069168 | A1* | 3/2012 | Huang | H04N 21/4223 348/77 |
| 2013/0336550 | A1* | 12/2013 | Kapur | G06K 9/00369 382/128 |
| 2016/0360165 | A1* | 12/2016 | Hurley | H04N 5/2252 |
| 2018/0189946 | A1* | 7/2018 | Kusens | G06T 7/0016 |
| 2019/0095711 | A1* | 3/2019 | Northcutt | G06T 7/73 |
| 2020/0394393 | A1* | 12/2020 | Kraft | G06K 9/00335 |
| 2021/0150193 | A1* | 5/2021 | Strigel | G06K 9/00805 |

FOREIGN PATENT DOCUMENTS

| CN | 103559505 | A | 2/2014 |
| CN | 104077774 | A | 10/2014 |
| CN | 104680127 | A | 6/2015 |
| CN | 106056053 | A | 10/2016 |
| CN | 106815855 | A | 6/2017 |
| CN | 107330354 | A | 11/2017 |
| CN | 108491820 | A | 9/2018 |
| KR | 101706864 | B1 | 2/2017 |

OTHER PUBLICATIONS

First Chinese Office Action from Chinese Patent Application No. 201810283309.4 dated Apr. 1, 2021.

* cited by examiner

METHOD, APPARATUS AND DEVICE FOR IDENTIFYING BODY REPRESENTATION INFORMATION IN IMAGE, AND COMPUTER READABLE STORAGE MEDIUM

The present application is based on PCT/CN2018/119083, filed on Dec. 4, 2018, which claims the priority of Chinese patent application No. 201810283309.4, filed on Apr. 2, 2018, and the entire content disclosed by the Chinese patent application is incorporated herein by reference as part of the present application.

TECHNICAL FIELD

Embodiments of the present disclosure relate to a method, an apparatus for identifying body representation information in an image, and a computer readable storage medium.

BACKGROUND

With the rapid development of virtual reality technologies, more and more virtual reality devices emerge in people's daily lives. Each device has its own unique characteristics, some focusing on immersion, some others focusing on interactivity, and so on.

For human-computer interaction, people are constantly exploring ways to interact more in line with human communication habits. Conventional human-computer interaction devices are: a mouse, a keyboard, a printer, a sketchpad, and so on. These are implemented with hardware devices.

SUMMARY

According to at least one embodiment of the present disclosure, there is provided a method for identifying body representation information in an image, including: determining a skeleton-like line of a body in the image; and performing identification of the body representation information according to the skeleton-like line.

For example, the body representation information includes: a posture state of at least one of a trunk, a limb, a head and neck, a hand, a foot, or a posture state of any combination thereof.

For example, determining a skeleton-like line of a body in the image includes: determining a midline of the body in the image, and determining a skeleton-like line of the body in the image according to the midline.

For example, determining a skeleton-like line of a body in the image includes: acquiring an outline of a binary map of a body in the image; and determining a skeleton-like line of the body in the image according to a direction gradient and the outline of the binary map of the body.

For example, acquiring an outline of a binary map of a body in the image includes: selecting a corresponding chrominance component for segmentation according to a color feature of the body, to determine the binary map of the body in the image; and extracting the outline of the binary map of the body from the binary map of the body.

For example, before selecting a corresponding chrominance component for segmentation according to a color feature of the body, converting an image from an RGB color representation to an YCrCb color representation.

For example, the body includes a hand, and acquiring an outline of a binary map of a body in the image includes: denoising the image; and determining the presence of a hand in the image by identifying a palm.

For example, determining a skeleton-like line of the body in the image according to a direction gradient and the outline of the binary map of the body includes: determining a point in the skeleton-like line based on each outline point (x, y) on the outline in the binary map of the body; and determining the skeleton-like line based on the points in the skeleton-like line.

For example, determining a point in the skeleton-like line based on each outline point (x, y) on the outline in the binary map of the body includes: determining whether two of all outline points in the outline of the binary map of the body are both boundary points; when the two outline points are both boundary points, determining a midpoint of the two outline points; determining whether the midpoint is within the outline of the binary map of the body; and when the midpoint is within the outline of the binary map of the body, determining the midpoint is a point in the skeleton-like line.

For example, determining whether two of all outline points in the outline of the binary map of the body are both boundary points includes: classifying each outline point (x, y) in the outline of the binary map of the body according to the y value, and classifying outline points with the same y value into a sequence $seq_y(x_1, x_2, \ldots )$, to obtain:

$$S(y)=\{seq_{yi}(x_{yi,1},x_{yi,2}, \ldots )|yi\in(1, \ldots ,h), x_i \in(1, \ldots ,w)\};$$

sorting each sequence according to the size of the x value, to obtain:

$$S'(y)=\{seq_{yi}(x_{yi,1}',x_{yi,2}', \ldots )|yi\in(1, \ldots ,h), x_i' \in(1, \ldots ,w)\};$$

where i, h and w are integers, and in the sequence corresponding to the same y value, based on the direction gradient of two points in the sequence, determining whether the two points are boundary points.

For example, in the sequence corresponding to the same y value, based on the direction gradients of two points in the sequence, determining whether the two points are boundary points includes: in the sequence corresponding to the same y value, taking the first two points $x_{yi,1}'$ and $x_{yi,2}'$, and according to the direction gradient of the two points $x_{yi,1}'$ and $x_{yi,2}'$, determining whether the two points are boundary points; when neither of the two points is a boundary point, removing the two points from the sequence and taking another two points; when one of the two points is not a boundary point, removing the said one point from the sequence and taking another point, until the two points are both boundary points.

It should be noted that the direction gradients of points in the image may be obtained by using a template for convolution operations based on, such as, Sobel operator, Roberts operator, Prewitt operator, Laplace operator and etc. According to the order of derivation, Roboert, Sobel, and Prewitt are first-order operators, and Laplace belongs to second-order operators. The obtained direction gradients of points may be used for edge detection. The above examples are only illustrative and the embodiments are not limited to those examples.

For example, determining whether two of all outline points in the outline of the binary map of the body are both boundary points further includes: in the sequence corresponding to the same y value, when there is fewer than two points in the sequence, deleting the sequence.

For example, when the two outline points are both boundary points, determining a midpoint of the two boundary points includes: determining a midpoint of the two points based on a formula $x_{yi,mod\ 1}=(x_{yi,1}'+x_{yi,2}')/2$; determining whether the midpoint is within the outline of the binary map of the body includes: when the midpoint is within the outline of the binary map of the body, recording the point into a new sequence lines_seq, and deleting $x_{yi,1}'$ and $x_{yi,2}'$; and when the midpoint is not within the outline of the binary map of the body, taking another point.

For example, performing identification of the body representation information according to the skeleton-like line includes: removing a point in a skeleton-like line that does not meet a first condition, to obtain a body represented by a skeleton-like line; and performing identification of the body representation information according to the body represented by the skeleton-like line in each image frame.

For example, removing a point in a skeleton-like line that does not meet a first condition, to obtain a body represented by a skeleton-like line includes: determining the number of pixels in each skeleton-like line; and removing a skeleton-like line having the number of pixels less than a first threshold, to obtain a body represented by a skeleton-like line.

For example, determining the number of pixels in each skeleton-like line includes: when the collection of all the skeleton-like lines is represented as:

$$skeLines(L) = \{L_1:\{(x_{y1,1}, y1)\}, L_2:\{(x_{y1,2}, y1)\}, \ldots \},$$

wherein $L_1, L_2, \ldots$ respectively represent one skeleton-like line, and $(x_{y1,1}, y1), (x_{y1,1}, y1), \ldots$ respectively represent a pixel point constituting the skeleton-like line; and all the points of the skeleton-like line is represented as $$ske(y) = \{lines\_seq(x_{yi,1}, x_{yi,2}, \ldots) | yi \in (1, \ldots, h), x_i \in (1, \ldots, w)\},$$

for each sequence in ske(y), counting the number N of skeleton-like lines in skeLines(L), and counting the number P of pixels of each skeleton-like line, to determine the number of pixels of each skeleton-like line $p_1, p_2, \ldots, p_N$, and representing the last pixel of each skeleton-like line as $L_1(p_1), L_2(p_2), \ldots, L_N(p_N)$.

For example, removing a point in a skeleton-like line that does not meet a first condition, to obtain a body represented by a skeleton-like line further includes: taking a first sequence of ske(y), taking points of the sequence as starting points of the skeleton-like line, with the number of starting points being the same as the number of elements in the sequence, and traversing all of the sequences from the second sequence of ske(y).

For example, traversing the sequences includes: starting from the first element of the current sequence, traversing the current sequence, acquiring a point $(x^*, y^*)$ in $L_1(p_1), L_2(p_2), \ldots, L_N(p_N)$ that is closest to the current element, recording the corresponding skeleton-like line as $L_*(p_*)$; when a distance between $(x^*, y^*)$ and $L_*(p_*)$ is smaller than a first value, adding $(x^*, y^*)$ to the end of the skeleton-like line $L_*(p_*)$;

when the distance between $(x^*, y^*)$ and $L_*(p_*)$ is not smaller than the first value, taking $(x^*, y^*)$ as a starting point of a new skeleton-like line and adding a new skeleton-like line to skeLines(L).

According to at least one embodiment of the present disclosure, there is provided an apparatus for identifying body representation information in an image, including: a determining unit configured to determine a skeleton-like line of a body in the image; and an identifying unit configured to perform identification of the body representation information according to the skeleton-like line.

For example, the body representation information includes: a posture state of at least one of a trunk, a limb, a head and neck, a hand, a foot, or a posture state of any combination thereof.

According to at least one embodiment of the present disclosure, there is provided a device for identifying body representation information in an image, including a processor and a memory; wherein the memory includes instructions executable by the processor, and the processor performs the above method when the instructions are executed.

According to at least one embodiment of the present disclosure, there is provided a computer readable storage medium having stored thereon computer program instructions which, when executed by a processor, implement the above method.

BRIEF DESCRIPTION OF THE DRAWINGS

Other features, objects, and advantages of the present disclosure will become more apparent from detailed description of non-limiting embodiments with reference to the following accompanying drawings.

DETAILED DESCRIPTION

Figure 1:
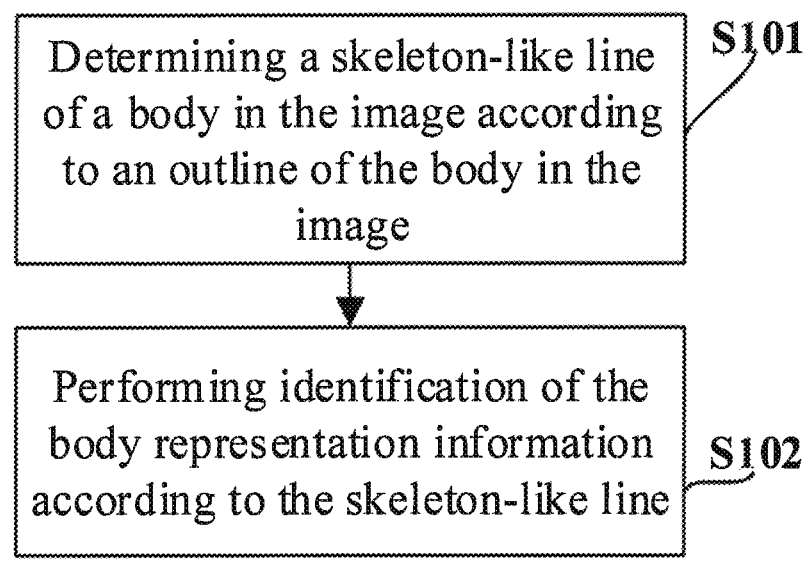
FIG. 1 is a flowchart of a method for identifying body representation information in an image according to an embodiment of the present disclosure.

The present disclosure will be further described in detail below in conjunction with the accompanying drawings and embodiments. It is understood that the specific embodiments described herein are merely illustrative of the present disclosure, rather than limiting the present disclosure. It should also be noted that, for the convenience of description, only parts related to the present disclosure are shown in the drawings.

It should be noted that the embodiments in the present disclosure and the features in the embodiments may be combined with each other without conflict. The present disclosure will be described in detail below with reference to the drawings and embodiments.

The inventors of the present disclosure have realized that, in terms of portability, it is difficult for a conventional mouse, a keyboard, and the like to meet real-time operation requirements, and operation with them is not convenient for virtual reality.

In contrast, identification of visual-based body representation information can effectively overcome the above disadvantages. Providing a camera on a virtual reality device can enable body identification interaction, which can reduce hardware costs and software costs.

It is important to characterize a body for identifying body representation information. A body representation is essentially a representation of a feature. Taking a gesture as an example, a gesture is characterized in 26 degrees of freedom for identification of a binocular camera, and the hardware and software development costs are high.

In the techniques known to the inventors, identification of body representation information is mostly performed by extracting an outline from a video frame, and identifying the body representation information based on a perimeter and an area of the outline. Such method has considerable error, and the identification rate is rather low when the body moves around and moves front and back in front of the mirror.

Referring to FIG. 1, a method for identifying body representation information in an image according to an embodiment of the present disclosure includes the following steps.

In step S101, a skeleton-like line of a body in the image is determined.

In step S102, identification of the body representation information is performed according to the skeleton-like line.

For example, the body representation information includes a posture state of at least one of the trunk, the limb, the head and neck, the hand, and the foot, or a posture state of any combination thereof.

By the present method, body representation information is identified by identifying a skeleton-like line, instead of identifying body representation information based on a perimeter and an area of an outline. Thus, the error caused by the present method may be very small, and the identification rate is relatively high. Moreover, it can realize identification of body representation information with a single camera, which can have a low requirement on equipment.

With this method, information of the user's body language expression can be better identified, so that the command can be further executed or translated into other languages according to the information expressed by the body language.

In some embodiments, the method is used to identify a body in an image of a video frame. The change in the body can be identified through a plurality of video frames, thereby identifying the information represented by the body from the body change.

For a video, identification can be performed on each frame of the video, or identification can be performed on those video frames obviously including a body, or identification can be performed once on a preset number of video frames. Of course, performing identification in each video frame can improve the accuracy, but the amount of calculation will be larger.

The skeleton-like line in the embodiment of the present disclosure may be a line simulating the bone in the body or in a body part.

In some embodiments, the skeleton-like line is a simple single line. For example, each finger, each arm, and each trunk respectively corresponds to only one skeleton-like line.

In some embodiments, the skeleton-like line can be determined by determining a midline of the body.

For example, in step S101, determining a skeleton-like line of a body in the image includes: acquiring an outline of a binary map of a body in the image; and determining a skeleton-like line of the body in the image according to a direction gradient and the outline of the binary map of the body.

For example, when extracting the outline of the binary map of the body, the corresponding chrominance component can be selected for segmentation according to the color of the body in the image to determine the binary map of the body in the image. Selecting the corresponding chrominance component of the color close to the color of the body can improve the accuracy in extracting an outline from a binary map.

In some embodiments, in step S101, acquiring an outline of a binary map of a body in the image includes: selecting a corresponding chrominance component for segmentation according to a color feature of the body, to determine the binary map of the body in the image; and extracting the outline of the binary map of the body from the binary map of the body.

For example, for a gesture, ostu segmentation can be performed according to the Cr channel of the image, to determine a gesture binary map, and in turn, to extract the outline of the gesture binary map. Since the Cr channel is suitable for representing the skin color of the human body, determining the gesture binary image by ostu segmentation through the Cr channel and then extracting the outline of the gesture binary image can improve the accuracy.

Usually, the image format of the video frame is in RGB format. To segment out an area of a hand, it is better to use a reliable skin tone model suitable for different skin tones and different lighting conditions, and the conventional RGB representation method is not suitable for the skin model.

In some embodiments, YCrCb space is used as the mapping space for the skin color distribution statistics. The advantage of YCrCb space is that it is less affected by change of luminance, and has a two-dimensional independent distribution, which can better limit the skin color distribution area. Before selecting a corresponding chrominance component for segmentation according to a color feature of the body, the color of the image needs to be converted. The color conversion can follow the formula as below:

$$\begin{cases} Y = 0.299*R + 0.578*G + 0.114*B \\ Cr = 0.5*R - 0.4187*G - 0.0813*B + 128 \\ Cb = -0.1687*R - 0.3313*G + 0.5*B + 128 \end{cases}$$

Figure 2:
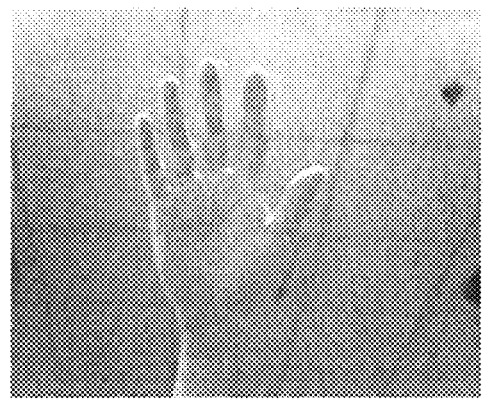
FIG. 2 is a schematic diagram of an image to be identified according to an embodiment of the present disclosure.
Figure 3:
FIG. 3 is a schematic diagram of a gesture binary diagram according to an embodiment of the present disclosure.

By segmenting the image in an YCrCb format by color channels, images of three channels of Y, Cr and Cb can be obtained respectively, where "Y" indicates luminance or luma, that is, a grayscale value; Cr reflects the difference between the red part of the RGB input signal and the luminance value of the RGB signal; Cb reflects the difference between the blue part of the RGB input signal and the luminance value of the RGB signal. Considering that the texture characteristic of human skin is closer to red, the Cr component is selected for segmentation, and the Cr channel is segmented out using the otsu algorithm (also known as Otsu method or maximum inter-class variance method) to obtain a binary map. The gesture is represented as white in the foreground and the background is represented as black, as shown in the image of FIG. 2, to obtain a binary map as shown in FIG. 3. In the embodiment of the present disclosure, the otsu algorithm is selected because it works well in calculating binary images.

Figure 4:
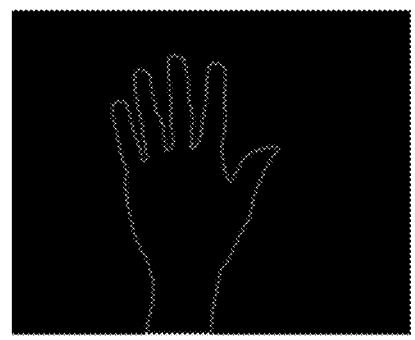
FIG. 4 is a schematic diagram of an outline of a gesture binary map according to an embodiment of the present disclosure.

The obtained binary map is searched for an outline, the largest outline is selected according to the position of the palm, as a gesture outline, as shown in FIG. 4.

In some embodiments, the body may refer to a hand. In order to improve identification accuracy, and to avoid identifying images with no hand therein, so as to reduce system work load, before acquiring the outline of the binary map of body in the image, the method may also include: denoising the image; and determining the presence of a hand in the image by identifying a palm.

Similarly, when the body refers to an arm, a leg, or a combination of at least two of a trunk, an arm, a leg, a head and neck, a hand, a foot and etc., which may be even a whole body, the body can be previously determined in the image by corresponding identification, before further identification is performed, thereby reducing the amount of calculation.

For the image subjected to the denoising process, for example, noise has been filtered, which can facilitate the identification of the body, and thus improves the identification accuracy. When the denoising process is performed, the denoise method may be selected according to the specific type of noise in the image. For example, for an ordinary image, the salt and pepper noise can be removed by median filtering. The denoised image may be represented by:

$$f(x,y)=med\{I(x-k,y-1),(k,1\in W)\}$$

For example, $f(x, y)$ represents the denoised image, and $W$ is generally a 3*3 or 5*5 two-dimensional template.

Then, a palm detection is performed, to determine whether there is a palm in the image $f(x, y)$. If there is a palm, it can be determined that there is a hand in the image, and the outline of the gesture binary map can be acquired, for example. If it is determined that there is no hand in the image, then the determination can be performed on the next frame image.

For example, determining a skeleton-like line of the body in the image according to a direction gradient and the outline of the binary map of the body may include: determining a point in the skeleton-like line based on each outline point (x, y) on the outline in the binary map of the body; and determining the skeleton-like line based on the points in the skeleton-like line.

For example, determining a point in the skeleton-like line based on each outline point (x, y) on the outline in the binary map of the body includes: determining whether two of all outline points in the outline of the binary map of the body are both boundary points; when the two outline points are both boundary points, determining a midpoint of the two outline points; determining whether the midpoint is within the outline of the binary map of the body; and when the midpoint is within the outline of the binary map of the body, determining the midpoint is a point in the skeleton-like line.

For example, determining whether two of all outline points in the outline of the binary map of the body are both boundary points includes: classifying each outline point (x, y) in the outline of the binary map of the body according to the y value, and classifying outline points with the same y value into a sequence $seq_y(x_1, x_2, \ldots )$, to obtain: $S(y)=\{seq_{yi}(x_{yi,1}, x_{yi,2}, \ldots )|yi\in(1,\ldots,h), x_i\in(1,\ldots,w)\}$; and sorting each sequence according to the value of x, to obtain: $S'(y)=\{seq_{yi}(x_{yi,1}', x_{yi,2}', \ldots )|yi\in(1,\ldots,h), x_i'\in(1,\ldots,w)\}$; and in the sequence corresponding to the same y value, based on the direction gradient of two points in the sequence, determining whether the two points are boundary points.

For example, in the sequence corresponding to the same y value, based on the direction gradient of two points in the sequence, determining whether the two points are boundary points includes: in the sequence corresponding to the same y value, taking the first two points $x_{yi,1}'$ and $x_{yi,2}'$, and according to the direction gradients of the two points $x_{yi,1}'$ and $x_{yi,2}'$, determining whether the two points are boundary points; if neither of the two points is a boundary point, removing the two points from the sequence and taking another two points; and if one of them is not a boundary point, removing it from the sequence and taking another point, until the two points are both boundary points.

For example, determining whether two of all outline points in the outline of the binary map of the body are both boundary points further includes: in the sequence corresponding to the same y value, if there is fewer than two points in the sequence, deleting the sequence.

For example, when the two outline points are both boundary points, determining a midpoint of the two boundary points includes: determining a midpoint of the two points based on a formula $x_{yi,mod\ 1}=(x_{yi,1}'+x_{yi,2}')/2$. Determining whether the midpoint is within the outline of the binary map of the body includes: if the midpoint is within the outline of the binary map of the body, recording the point into a new sequence lines_seq, and deleting $x_{yi,1}'$ and $x_{yi,2}'$; and if the midpoint is not within the outline of the binary map of the body, taking another point.

Based on the above, in some embodiments, determining the skeleton-like line of the body in the image based on the directional gradient and the outline of the binary map of the body includes: classifying each outline point (x, y) in the outline of the binary map of the body according to the y value, and classifying outline points with the same y value into a sequence $seq_y(x_1, x_2, \ldots )$, to obtain:

$$S(y)=\{seq_{yi}(x_{yi,1},x_{yi,2},\ldots )|yi\in(1,\ldots,h),x_i\in(1,\ldots,w)\}.$$

sorting each sequence according to the size of the x value, to obtain:

$$S'(y)=\{seq_{yi}(x_{yi,1}',x_{yi,2}',\ldots )|yi\in(1,\ldots,h),x_i'\in(1,\ldots,w)\};$$

in the sequence corresponding to any $y_i$ value, if there are fewer than two points in the sequence, deleting the sequence, otherwise, taking the first two points $x_{yi,1}'$ and $x_{yi,2}'$, according to the direction gradient of the two points, determining whether the two points are boundary points; if neither of the two points is a boundary point, removing the two points from the sequence and taking another two points; if one of them is not a boundary point, removing it from the sequence and taking another point, until the two points are both boundary points; determining a midpoint $x_{yi,mod\ 1}=(x_{yi,1}'+x_{yi,2}')/2$ of the two points; if the midpoint is within the outline of the binary map of the body, recording the point into a new sequence lines_seq, and deleting $x_{yi,1}'$ and $x_{yi,2}'$; and if the midpoint is not within the outline of the binary map of the body, taking another point; if there is an element in the lines_seq, it means that the sequence corresponding to $y_i$ has a point of the skeleton-like line, recording this $y_i$, if there is no element in the lines_seq, deleting this $y_i$; traversing all the values $y_i$, to get all the points of the skeleton-like line:

$$ske(y)=\{lines\_seq(x_{yi,1},x_{yi,2},\ldots )|yi\in(1,\ldots,h),x_i\in(1,\ldots,w)\}.$$

Figure 5:
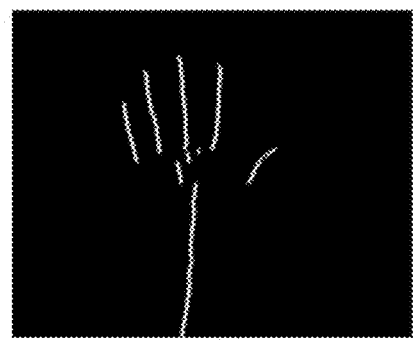
FIG. 5 is a schematic diagram of a skeleton-like line according to an embodiment of the present disclosure.

For the image shown in FIG. 2, a skeleton-like line can be obtained as shown in FIG. 5.

For example, in step S102, before the identification of the body representation information is performed, points in the skeleton-like line that do not meet a first condition can be removed, thereby avoiding misjudgment caused by interference from points that do not meet the first condition, which can make identification of the body representation information more accurate.

For example, in step S102, performing identification of the body representation information according to the skeleton-like line includes: removing a point in a skeleton-like line that does not meet a first condition, to obtain a body represented by a skeleton-like line; performing identification of the body representation information according to the body represented by the skeleton-like line in each image frame.

In some embodiments, removing a point in a skeleton-like line that does not meet a first condition, to obtain a body represented by a skeleton-like line includes: determining a number of pixels in each skeleton-like line; and removing a skeleton-like line having the number of pixels less than a first threshold, to obtain a body represented by a skeleton-like line.

For example, determining the number of pixels in each skeleton-like line can be implemented in the following manner. The collection of all the skeleton-like lines is represented as:

skeLines(L)={$L_1$:{($x_{y1,1}$,y1)},$L_2$:{($x_{y1,2}$,y1)}, . . . }, where $L_1$, $L_2$, . . . respectively represent one skeleton-like line, ($x_{y1,1}$, y1), ($x_{y1,1}$, y1), . . . respectively represent a pixel point constituting the skeleton-like line.

For each sequence, the number N of skeleton-like lines in skeLines(L) is counted, and the number P of pixels of each skeleton-like line is counted, to determine the number of pixels of each skeleton-like line $p_1$, $p_2$, . . . , $p_N$. The last pixel of each skeleton-like line is represented as $L_1(p_1)$, $L_2(p_2)$, . . . , $L_N(p_N)$.

In some embodiments, removing a point in a skeleton-like line that does not meet a first condition, to obtain a body represented by a skeleton-like line further includes: taking a first sequence of ske(y), taking points of the sequence as starting points of the skeleton-like line, with the number of starting points being the same as the number of elements in the sequence, and traversing all of the sequences from the second sequence of ske(y).

In some embodiments, traversing the sequences may include: starting from the first element of the current sequence, traversing the current sequence, acquiring a point (x*, y*) in $L_1(p_1)$, $L_2(p_2)$, . . . , $L_N(p_N)$ that is closest to the current element, recording the corresponding skeleton-like line as $L_*(p_*)$, when the distance between (x*, y*) and $L_*(p_*)$ is smaller than a value, adding (x*, y*) to the end of the skeleton-like line $L_*(p_*)$, otherwise taking (x*, y*) as a starting point of a new skeleton-like line and adding a new skeleton-like line to skeLines(L).

In some embodiments, removing a point in a skeleton-like line that does not meet a first condition, to obtain a body represented by a skeleton-like line may include: taking the first sequence of ske(y), taking the points of the first sequence as the starting points of a skeleton-like line, wherein the number of starting points is the same as the number of elements in the sequence, each skeleton-like line is a set of pixels, and the set of all skeleton-like lines is represented as:

skeLines(L)={$L_1$:{($x_{y1,1}$,y1)},$L_2$:{($x_{y1,2}$,y1)}, . . . }, where, for example, $L_1$, $L_2$, . . . respectively represent one skeleton-like line, and ($x_{y1,1}$, y1), ($x_{y1,1}$, y1), . . . respectively represent a pixel point constituting the skeleton-like line; traversing all of the sequences from the second sequence of ske(y), for each sequence, counting the number N of skeleton-like lines in skeLines(L), and counting the number P of pixels of each skeleton-like line, to determine the number of pixels of each skeleton-like line $p_1$, $p_2$, . . . $p_N$, wherein the last pixel of each skeleton-like line is represented as $L_1(p_1)$, $L_2(p_2)$, . . . , $L_N(p_N)$; starting from the first element of the current sequence, traversing the current sequence, acquiring a point (x*, y*) in $L_1(p_1)$, $L_2(p_2)$, . . . , $L_N(p_N)$ that is closest to the current element, recording the corresponding skeleton-like line as $L_*(p_*)$, when the distance between (x*, y*) and $L_*(p_*)$ is smaller than a value, adding (x*, y*) to the end of the skeleton-like line $L_*(p_*)$, otherwise taking (x*, y*) as a starting point of a new skeleton-like line and adding a new skeleton-like line to skeLines(L); and removing a skeleton-like line having a number of pixels less than a first threshold from skeLines(L), to obtain a body represented by a skeleton-like line:

$$skeLines(L) = \bigcup_{i=1}^{+\infty} L_i : \{(x_{i1}, y_j), \ldots \}, x_{ik} \in (1, \ldots, w), j \in (1, \ldots, h).$$

Figure 6:
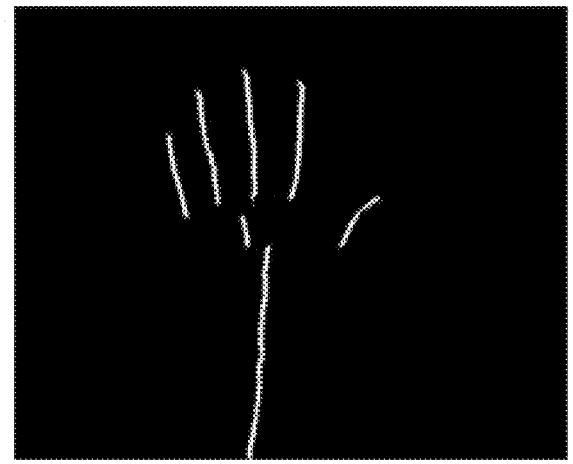
FIG. 6 is a schematic diagram of a gesture diagram of a skeleton-like line representation according to an embodiment of the present disclosure.

As shown in FIG. 2, the gesture diagram is as shown in FIG. 6.

It can be seen that the embodiment of the present disclosure can identify the skeleton-like line in the image, and can express various bodies more clearly through the skeleton-like line. The features can be more abundant, and the identification rate can be greatly improved, to provide a reliable basis for further identifying the body representation information.

It should be noted that although the operations of the disclosed methods are described in a particular order in the figures, it is not a requirement or implied that the operations must be performed in that particular order, nor that all of the operations shown must be performed to achieve the desired results. Instead, the steps depicted in the flowcharts can be performed in a changed order. Additionally or alternatively, certain steps can be skipped, multiple steps can be combined into one step, and/or one step can be divided into multiple steps.

Figure 7:
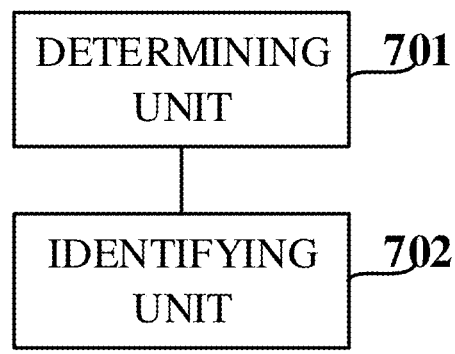
FIG. 7 is a schematic structural diagram of an apparatus for identifying body representation information in an image according to an embodiment of the present disclosure.

An embodiment of the present disclosure further provides an apparatus for identifying body representation information in an image. The apparatus corresponds to the identification method in the above embodiment. For the sake of brevity of the description, the following is only a brief description. For the specific embodiment, reference can be made to the above embodiment. As shown in FIG. 7, the identification apparatus includes: a determining unit 701 configured to determine a skeleton-like line of a body in the image; and an identifying unit 702 configured to perform identification of the body representation information according to the skeleton-like line.

The determining unit 701 and the identifying unit 702 are functional entities, which can be implemented by software, hardware or firmware, for example by a processor executing program codes or a programmable logic circuit designed to perform corresponding functions.

For example, the body representation information includes a posture state of at least one of the trunk, the limb, the head and neck, the hand, and the foot, or a posture state of any combination thereof.

For example, the determining unit 701 is specifically configured to: acquire an outline of a binary map of a body in the image; and determine a skeleton-like line of the body in the image according to a direction gradient and the outline of the binary map of the body.

For example, the determining unit 701 acquiring an outline of a binary map of a body in the image includes: selecting a corresponding chrominance component for segmentation according to a color feature of the body, to determine the binary map of the body in the image; and extracting the outline of the binary map of the body from the binary map of the body.

For example, when the body is specifically a hand, the determining unit 701 is further configured to: denoise the image before acquiring the outline of the binary map of body in the image; and determine the presence of a hand in the image by identifying a palm.

For example, the determining unit 701 determining a skeleton-like line of the body in the image according to a direction gradient and the outline of the binary map of the body includes: classifying each outline point (x, y) in the outline of the binary map of the body according to the y value, and classifying outline points with the same y value into a sequence $seq_y(x_1, x_2, \ldots )$, to obtain:

$$S(y) = \{seq_{yi}(x_{yi,1}, x_{yi,2}, \ldots ) | yi \in (1, \ldots, h), x_i \in (1, \ldots, w)\}; \text{ and}$$

sorting each sequence according to the size of the x value, to obtain:

$$S'(y) = \{seq_{yi}(x_{yi,1}', x_{yi,2}', \ldots ) | yi \in (1, \ldots, h), x_i' \in (1, \ldots, w)\};$$

in the sequence corresponding to any $y_i$ value, if there are fewer than two points in the sequence, deleting the sequence, otherwise, taking the first two points $x_{yi,1}'$ and $x_{yi,2}'$, according to the direction gradient of the two points, determining whether the two points are boundary points; if neither of the two points is a boundary point, removing the two points from the sequence and taking another two points; if one of them is not a boundary point, removing it from the sequence and taking another point, until the two points are both boundary points; determining a midpoint $x_{yi,mod\ 1} = (x_{yi,1}' + x_{yi,2}')/2$ of the two points; if the midpoint is within the outline of the binary map of the body, recording the point into a new sequence lines_seq, and deleting $x_{yi,1}'$ and $x_{yi,2}'$; and if the midpoint is not within the outline of the binary map of the body, taking another point; if there is an element in the lines_seq it means that the sequence corresponding to $y_i$ has a point of the skeleton-like line, recording this $y_i$, if there is no element in the lines_seq, deleting this $y_i$; traversing all the values $y_i$, to get all the points of the skeleton-like line:

$$ske(y) = \{lines\_seq(x_{yi,1}, x_{yi,2}, \ldots ) | yi \in (1, \ldots, h), x_i \in (1, \ldots, w)\}.$$

For example, the identifying unit 702 is specifically configured to: remove a point in a skeleton-like line that does not meet a first condition, to obtain a body represented by a skeleton-like line; and perform identification of the body representation information according to the body represented by the skeleton-like line in each image frame.

For example, the identifying unit 702 removing a point in a skeleton-like line that does not meet a first condition, to obtain a body represented by a skeleton-like line includes: taking the first sequence of ske(y), taking the points in the sequence as the starting points of a skeleton-like line, wherein the number of starting points is the same as the number of elements in the sequence, each skeleton-like line is a set of pixels, and the set of all skeleton-like lines is represented as:

$$skeLines(L) = \{L_1: \{(x_{y1,1}, y1)\}, L_2: \{(x_{y1,2}, y1)\}, \ldots \},$$

where, for example, $L_1, L_2, \ldots$ respectively represent one skeleton-like line, and $(x_{y1,1}, y1), (x_{y1,1}, y1), \ldots$ respectively represent a pixel point constituting the skeleton-like line; traversing all of the sequences from the second sequence of ske(y), for each sequence, counting the number N of skeleton-like lines in skeLines(L) and counting the number P of pixels of each skeleton-like line, to determine the number of pixels of each skeleton-like line $p_1, p_2, \ldots p_N$, wherein the last pixel of each skeleton-like line is represented as $L_1(p_1)$, $L_2(p_2), \ldots, L_N(p_N)$; starting from the first element of the current sequence, traversing the current sequence, acquiring a point (x*, y*) in $L_1(p_1), L_2(p_2), \ldots, L_N(p_N)$ that is closest to the current element, recording the corresponding skeleton-like line as $L_*(p_*)$, when the distance between (x*, y*) and $L_*(p_*)$ is smaller than a first value, adding (x*, y*) to the end of the skeleton-like line $L_*(p_*)$, otherwise taking (x*, y*) as a starting point of a new skeleton-like line and adding a new skeleton-like line to skeLines(L); and removing a skeleton-like line having a number of pixels less than a first threshold from skeLines(L), to obtain a body represented by a skeleton-like line:

$$skeLines(L) = \bigcup_{i=1}^{+\infty} L_i : \{(x_{i1}, y_j), \ldots \},$$

For example, $x_{ik} \in (1, \ldots, w), j \in (1, \ldots, h)$.

It should be understood that the units or modules recited in the apparatus correspond to the various steps in the method described with reference to FIG. 1. Thus, the operations and features described above for the method are equally applicable to the apparatus and the units contained therein, and are not described herein again. The apparatus can be implemented in a browser or other security application of an electronic device in advance, or can be loaded into a browser or a secure application of the electronic device thereof by downloading or the like. Corresponding units in the apparatus can cooperate with units in the electronic device to implement the solution of the embodiments of the present disclosure.

Further, in an embodiment of the present disclosure, there is also provided a device for identifying body representation information in an image, including a processor and a memory containing instructions executable by the processor. The method according to any one of the foregoing embodiments is performed when the processor executes the instructions.

Figure 8:
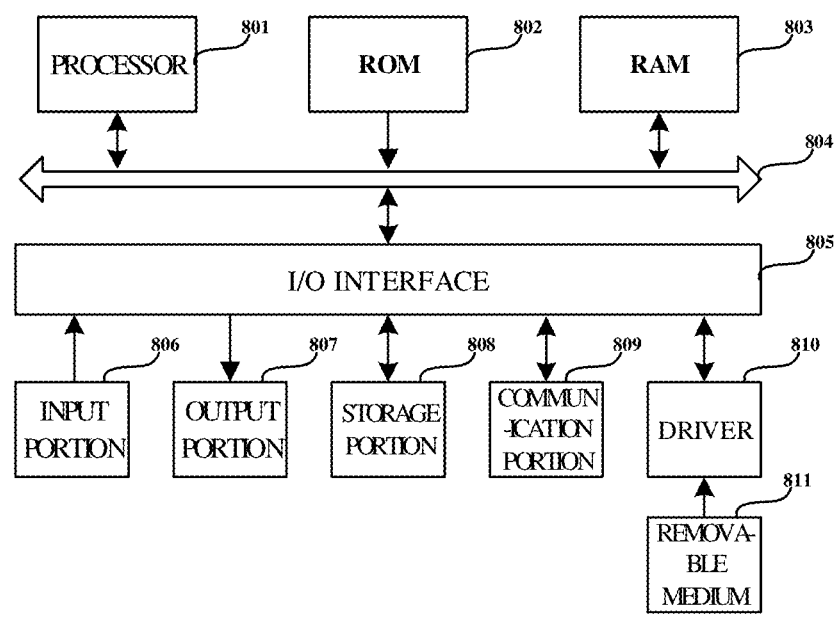
FIG. 8 is a schematic structural diagram of a device for identifying body representation information in an image according to an embodiment of the present disclosure.

Referring now to FIG. 8, it shows a schematic structural diagram of a computer system suitable for implementing a terminal device or a server of an embodiment of the present disclosure.

As shown in FIG. 8, the computer system includes a processor 801 that can perform various appropriate actions and processes in accordance with a program stored in a read only memory (ROM) 802 or a program loaded from a storage portion 808 into a random access memory (RAM) 803. In the RAM 803, various programs and data required for system operation are also stored. The processor 801, the ROM 802, and the RAM 803 are connected to each other via a bus 804. An input/output (I/O) interface 805 is also connected to a bus 804.

The following components are connected to the I/O interface 805: an input portion 806 including a keyboard, a mouse, etc.; an output portion 807 including, for example, a cathode ray tube (CRT), a liquid crystal display (LCD), and the like, and a speaker, etc., a storage portion 808 including a hard disk or the like; and a communication portion 809 including a network interface card such as a LAN card, a modem, or the like. The communication section 809 performs communication processing via a network such as the Internet. Driver 810 is also connected to I/O interface 805 as needed. A removable medium 811, such as a magnetic disk, an optical disk, a magneto-optical disk, a semiconductor memory or the like, is mounted on the drive 810 as needed so that a computer program read therefrom is installed into the storage portion 808 as needed.

In particular, according to an embodiment of the present disclosure, the process described above with reference to FIG. 1 can be implemented as a computer software program. For example, an embodiment of the present disclosure includes a computer program product including a computer program tangibly embodied on a machine readable medium. The computer program includes program codes for performing the method of FIG. 1. In such an embodiment, the computer program can be downloaded and installed from the network via the communication portion 809, and/or installed from the removable media 811.

The flowchart and block diagrams in the Figures illustrate the architecture, functionality, and operation of possible implementations of the systems, methods, and computer program products in accordance with various embodiments of the present disclosure. In this regard, each block of the flowchart or block diagrams can represent a module, a program segment, or a portion of codes that includes one or more executable instructions for implementing the specified logical functions. It should also be noted that in some alternative implementations, the functions noted in the blocks can also occur in a different order than that illustrated in the drawings. For example, two successively represented blocks can in fact be executed substantially in parallel, and they can sometimes be executed in the reverse order, depending upon the functionality involved. It is also noted that each block of the block diagrams and/or flowcharts, and combinations of blocks in the block diagrams and/or flowcharts, can be implemented with a dedicated hardware-based system that performs the specified functions or operations, or can be implemented with a combination of dedicated hardware and computer instructions.

The units or modules described in the embodiments of the present disclosure can be implemented by software, or can be implemented by hardware. The units or modules described can also be provided in the processor. For example, it can be described as: a processor including an XX unit, a YY unit, and a ZZ unit. For example, in some cases, the names of these units or modules do not constitute a limitation on the unit or module itself. For example, the XX unit can also be described as "a unit for XX".

In another aspect, the present disclosure also provides a computer readable storage medium that implements the methods of the foregoing embodiments when instructions in the storage medium are executed. The computer readable storage medium can be a computer readable storage medium included in the apparatus described in the above embodiments; or can be a computer readable storage medium that is separately present and not incorporated in a device. The computer readable storage medium stores one or more programs that are used by one or more processors to perform the method for identifying body representation information in an image described in the present disclosure.

In an embodiment of the present disclosure, the processor can be a central processing unit (CPU) or a field programmable logic array (FPGA) or a single chip microcomputer (MCU) or a digital signal processor (DSP) or an application specific integrated circuit (ASIC) and a logic computing device with data processing capability and/or program execution capability.

The above description is only a preferred embodiment of the present disclosure and a description of the principles of the applied technology. It should be understood by those skilled in the art that the scope of the present disclosure referred to in the present disclosure is not limited to the specific combination of the above technical features, and should also cover other technical solutions formed by any combination of the above technical features or equivalent features thereof without departing from the inventive concept. Other technical solutions can be formed by any combination of their equivalent features, for example, a technical solution in which the above features are replaced with technical features having similar functions disclosed in (but not limited to) the present disclosure.

What is claimed is:

1. A method for identifying body representation information in an image, comprising:
    determining a skeleton-like line of a body in the image according to an outline of the body in the image; and
    performing identification of the body representation information according to the skeleton-like line
    wherein determining a skeleton-like line of a body in the image according to an outline of the body in the image comprises:
    acquiring an outline of a binary map of a body in the image; and
    determining a skeleton-like line of the body in the image according to a direction gradient and the outline of the binary map of the body;
    wherein acquiring an outline of a binary map of a body in the image comprises:
    selecting a corresponding chrominance component for segmentation according to a color feature of the body, to determine the binary map of the body in the image; and
    extracting the outline of the binary map of the body from the binary map of the body.

2. The method of claim 1, wherein the body representation information comprises: a posture state of at least one of a trunk, a limb, a head and neck, a hand, a foot; or a posture state of any combination thereof.

3. The method of claim 1, wherein before selecting a corresponding chrominance component for segmentation according to a color feature of the body, converting an image from an RGB color representation to a YCrCb color representation.

4. The method of claim 1, wherein the body comprises a hand, and acquiring an outline of a binary map of a body in the image comprises:
    denoising the image; and
    determining the presence of a hand in the image by identifying a palm.

5. The method of claim 1, wherein determining a skeleton-like line of the body in the image according to a direction gradient and the outline of the binary map of the body comprises:
    determining a point in the skeleton-like line based on each outline point (x, y) on the outline in the binary map of the body; and
    determining the skeleton-like line based on the points in the skeleton-like line.

6. The method of claim 5, wherein determining a point in the skeleton-like line based on each outline point (x, y) on the outline in the binary map of the body comprises:
   determining whether two of all outline points in the outline of the binary map of the body are both boundary points;
   when the two outline points are both boundary points, determining a midpoint of the two outline points;
   determining whether the midpoint is within the outline of the binary map of the body; and
   when the midpoint is within the outline of the binary map of the body, determining the midpoint is a point in the skeleton-like line.

7. The method of claim 6, wherein determining whether two of all outline points in the outline of the binary map of the body are both boundary points comprises:
   classifying each outline point (x, y) in the outline of the binary map of the body according to the y value, and classifying outline points with the same y value into a sequence $seq_y(x_1, x_2, \ldots)$, to obtain:

$$S(y) = \{seq_{y,i}(x_{yi,1}, x_{yi,2}, \ldots) | yi \in (1, \ldots, h), x_i \in (1, \ldots, w)\};$$

sorting each sequence according to the size of the x value, to obtain:

$$S'(y) = \{seq_{y,i}(x_{yi,1}', x_{yi,2}', \ldots) | yi \in (1, \ldots, h), x_i' \in (1, \ldots, w)\};$$

where i, h and w are integers, and
   in the sequence corresponding to the same y value, based on the direction gradient of two points in the sequence, determining whether the two points are boundary points.

8. The method of claim 7, wherein in the sequence corresponding to the same y value, based on the direction gradient of two points in the sequence, determining whether the two points are boundary points comprises:
   in the sequence corresponding to the same y value, taking the first two points $x_{yi,1}'$ and $x_{yi,2}'$, and according to the direction gradient of the two points $x_{yi,1}'$ and $x_{yi,2}'$, determining whether the two points are boundary points;
   when neither of the two points is a boundary point, removing the two points from the sequence and taking another two points;
   when one of the two points is not a boundary point, removing the said one point from the sequence and taking another point,
   until the two points are both boundary points.

9. The method of claim 7, wherein determining whether two of all outline points in the outline of the binary map of the body are both boundary points further comprises:
   in the sequence corresponding to the same y value, when there is fewer than two points in the sequence, deleting the sequence.

10. The method according to claim 6, wherein
    when the two outline points are both boundary points, determining a midpoint of the two boundary points comprises:
      determining a midpoint of the two points based on a formula $$x_{yi,mod\ 1} = (x_{yi,1}' + x_{yi,2}')/2, \text{ where } i \text{ is an integer; and}$$

determining whether the midpoint is within the outline of the binary map of the body comprises:
      when the midpoint is within the outline of the binary map of the body, recording the point into a new sequence lines_seq, and deleting $x_{yi,1}'$ and $x_{yi,2}'$; and
      when the midpoint is not within the outline of the binary map of the body, taking another point.

11. The method according to claim 5, wherein performing identification of the body representation information according to the skeleton-like line comprises:
    removing a point in a skeleton-like line that does not meet a first condition, to obtain a body represented by a skeleton-like line; and
    performing identification of the body representation information according to the body represented by the skeleton-like line in each image frame.

12. The method of claim 11, wherein removing a point in a skeleton-like line that does not meet a first condition, to obtain a body represented by a skeleton-like line comprises:
    determining the number of pixels in each skeleton-like line; and
    removing a skeleton-like line having the number of pixels less than a first threshold, to obtain a body represented by a skeleton-like line.

13. The method of claim 12, wherein determining the number of pixels in each skeleton-like line comprises: when the collection of all the skeleton-like lines is represented as:

$$skeLines(L) = \{L_1: \{(x_{y1,1}, y1)\}, L_2: \{(x_{y1,2}, y1)\}, \ldots\},$$

wherein $L_1, L_2, \ldots$ respectively represent one skeleton-like line, and $(x_{y1,1}, y1), (x_{y1,1}, y1), \ldots$ respectively represent a pixel point constituting the skeleton-like line; and
    all the points of the skeleton-like line is represented as $$ske(y) = \{lines\_seq(x_{yi,1}, x_{yi,2}, \ldots) | yi \in (1, \ldots, h), x_i \in (1, \ldots, w)\},$$

where i, h and w are integers, for each sequence in ske(y), counting the number N of skeleton-like lines in skeLines(L) and counting the number P of pixels of each skeleton-like line, to determine the number of pixels of each skeleton-like line $p_1, p_2, \ldots, p_N$, and representing the last pixel of each skeleton-like line as $L_1(p_1), L_2(p_2), \ldots, L_N(p_N)$, where N is an integer.

14. The method of claim 13, wherein removing a point in a skeleton-like line that does not meet a first condition, to obtain a body represented by a skeleton-like line further comprises:
    taking a first sequence of ske(y), taking points of the sequence as starting points of the skeleton-like line, with the number of starting points being the same as the number of elements in the sequence, and traversing all of the sequences from the second sequence of ske(y).

15. The method of claim 14, wherein traversing the sequences comprises:
    starting from the first element of the current sequence, traversing the current sequence, acquiring a point (x*, y*) in $L_1(p_1), L_2(p_2), \ldots, L_N(p_N)$ that is closest to the current element, recording the corresponding skeleton-like line as $L_*(p_*)$;
    when a distance between (x*, y*) and $L_*(p_*)$ is smaller than a first value, adding (x*, y*) to the end of the skeleton-like line $L_*(p_*)$;
    when the distance between (x*, y*) and $L_*(p_*)$ is not smaller than the first value, taking (x*, y*) as a starting point of a new skeleton-like line and adding a new skeleton-like line to skeLines(L).

16. A device for identifying body representation information in an image, comprising a processor and a memory; wherein:
    the memory comprises instructions executable by the processor, and when the instructions are executed, the processor performs a method for identifying body representation information in an image, the method comprising:

determining a skeleton-like line of a body in the image according to an outline of the body in the image; and performing identification of the body representation information according to the skeleton-like line, wherein determining a skeleton-like line of a body in the image according to an outline of the body in the image comprises:

acquiring an outline of a binary map of a body in the image; and determining a skeleton-like line of the body in the image according to a direction gradient and the outline of the binary map of the body;

wherein acquiring an outline of a binary map of a body in the image comprises:

selecting a corresponding chrominance component for segmentation according to a color feature of the body, to determine the binary map of the body in the image; and extracting the outline of the binary map of the body from the binary map of the body.

17. A non-transitory computer readable storage medium having stored thereon computer program instructions which, when executed by a processor, implement the method of claim 1.

18. A method for identifying body representation information in a video, comprising: performing a method for identifying body representation information in an image on video frames that are determined to include a body, the method comprising:

determining a skeleton-like line of a body in the image according to an outline of the body in the image; and performing identification of the body representation information according to the skeleton-like line, wherein determining a skeleton-like line of a body in the image according to an outline of the body in the image comprises:

acquiring an outline of a binary map of a body in the image; and determining a skeleton-like line of the body in the image according to a direction gradient and the outline of the binary map of the body;

wherein acquiring an outline of a binary map of a body in the image comprises:

selecting a corresponding chrominance component for segmentation according to a color feature of the body, to determine the binary map of the body in the image; and extracting the outline of the binary map of the body from the binary map of the body.

\* \* \* \* \*